United States Patent
Matsumura et al.

(10) Patent No.: US 11,240,788 B2
(45) Date of Patent: Feb. 1, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 131 days.

(21) Appl. No.: 16/611,703

(22) PCT Filed: May 10, 2017

(86) PCT No.: PCT/JP2017/017758
§ 371 (c)(1),
(2) Date: Nov. 7, 2019

(87) PCT Pub. No.: WO2018/207296
PCT Pub. Date: Nov. 15, 2018

(65) Prior Publication Data
US 2021/0144699 A1    May 13, 2021

(51) Int. Cl.
*H04W 72/04* (2009.01)
*H04L 1/18* (2006.01)
*H04W 72/12* (2009.01)

(52) U.S. Cl.
CPC ....... *H04W 72/0413* (2013.01); *H04L 1/1812* (2013.01); *H04W 72/1268* (2013.01)

(58) Field of Classification Search
CPC ......... H04W 27/0413; H04W 72/1268; H04W 28/06; H04J 13/16; Y02D 30/70;
(Continued)

(56) References Cited

U.S. PATENT DOCUMENTS 9,178,560 B1* 11/2015 Kerhuel ................. H04L 27/26
9,451,599 B2* 9/2016 Cheng ................... H04L 1/0073
(Continued)

FOREIGN PATENT DOCUMENTS

CN    110832923 A    2/2020
EP    3621378 A1    3/2020

OTHER PUBLICATIONS

Office Action issued in counterpart Chinese Patent Application No. 201780092885.4, dated Mar. 16, 2021 (15 pages).
(Continued)

*Primary Examiner* — Hanh N Nguyen
(74) *Attorney, Agent, or Firm* — Osha Bergman Watanabe & Burton LLP

(57) ABSTRACT

According to the present invention, UL control information can be reported properly in future radio communication systems. According to one aspect of the present invention, a user terminal has a transmission section that transmits a UL signal, including UL control information and/or a scheduling request, and a generation section that generates the UL signal, and when reporting the UL control information, the generation section generates the UL signal by using code resources associated with values of the UL control information and the presence/absence of a scheduling request, and, when not reporting the UL control information but reporting the scheduling request, the generation section generates the UL signal by using a specific code resource.

6 Claims, 14 Drawing Sheets

(58) Field of Classification Search
CPC ..... H04L 27/26; H04L 1/1812; H04L 1/1854; H04L 27/2613; H04L 1/0073; H04L 27/2602

See application file for complete search history.

(56) References Cited

U.S. PATENT DOCUMENTS

| | | | | |
|---|---|---|---|---|
| 10,771,300 | B2* | 9/2020 | Liang | H04L 27/2602 |
| 10,805,911 | B2* | 10/2020 | Matsumura | H04L 27/2613 |
| 2020/0137789 | A1* | 4/2020 | Matsumura | H04L 27/26 |
| 2020/0170005 | A1* | 5/2020 | Matsumura | H04W 72/0413 |
| 2020/0186299 | A1* | 6/2020 | Lunttila | H04L 1/1812 |
| 2020/0195387 | A1* | 6/2020 | Matsumura | H04L 1/1854 |

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

3GPP TSG RAN WG1 Meeting #88; R1-1702811; "DMRS-based vs. Sequence-based PUCCH in short duration" NTT Docomo, Inc.; Feb. 13-17, 2017; Athens, Greece (10 pages).

3GPP TSG RAN WG1 Meeting #89; R1-1708470; "Sequence-based PUCCH for UCI of up to 2 bits" NTT Docomo, Inc.; May 15-19, 2017; Hangzhou, P.R. China (10 pages).

International Search Report issued in International Application No. PCT/JP2017/017758, dated Jul. 11, 2017 (2 pages).

Written Opinion issued in International Application No. PCT/JP2017/017758; dated Jul. 11, 2017 (3 pages).

Extended European Search Report issued in counterpart European Patent Application No. 17909541.9, dated Dec. 10, 2020 (12 pages).

ZTE; "Scheduling Request Enhancements"; 3GPP TSG RAN WG1 Meeting #89, R1-1707192; Hangzhou, P.R. China; May 15-19, 2017 (3 pages).

Motorola Mobility, Lenovo; "Short PUCCH structure"; 3GPP TSG RAN WG1 Meeting #89, R1-1708308; Hangzhou, P. R. China; May 15-19, 2017 (5 pages).

Motorola; "Uplink ACK/NACK Performance with and without Reference Signals"; 3GPP TSG RAN1 #48bis, R1-071347; St. Julian's, Malta; Mar. 26-30, 2007 (3 pages).

3GPP TSG RAN WG1 Meeting #88bis; R1-1704301 "Discussion on SR in shortened TTI scenario" Huawei, HiSilicon; Spokane, USA; Apr. 3-7, 2017 (4 pages).

Office Action issued in Japanese Application No. 2019-516804; dated Aug. 10, 2021 (10 pages).

* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using 1-ms subframes (also referred to as "transmission time intervals (TTIs)" and so on). This subframe is the unit of time it takes to transmit one channel-encoded data packet, and is the processing unit in, for example, scheduling, link adaptation, retransmission control (HARQ (Hybrid Automatic Repeat reQuest)) and so on.

Also, in existing LTE systems (for example, LTE Rel. 8 to 13), a user terminal (UE (User Equipment)) transmits uplink control information (UCI) by using a UL control channel (for example, PUCCH (Physical Uplink Control CHannel)) and/or a UL data channel (for example, PUSCH (Physical Uplink Shared CHannel)). The format of this UL control channel is referred to as "PUCCH format" and so on.

UCI includes at least one of a scheduling request (SR), retransmission control information in response to DL data (DL data channel (PDSCH (Physical Downlink Shared CHannel))) (also referred to as "HARQ-ACK (Hybrid Automatic Repeat reQuest-Acknowledgement)," "ACK," "NACK (Negative ACK)" and so on) and channel state information (CSI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill mutually varying requirements (for example, ultra-high speed, large capacity, ultra-low latency, etc.).

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

Furthermore, in LTE/NR, studies are underway to use UL control channels of various formats (UL control channel formats). When applying UCI transmission methods in existing LTE systems (LTE Rel. 13 or earlier versions) to such future radio communication systems, there is a risk that the coverage, throughput and/or others may deteriorate.

The present invention has been made in view of the above, and it is therefore an object of the present invention to provide a user terminal and a radio communication method, whereby UL control information can be reported properly in future radio communication systems.

Solution to Problem

According to one aspect of the present invention, a user terminal has a transmission section that transmits a UL signal, including UL control information and/or a scheduling request, and a generation section that generates the UL signal, and, when reporting the UL control information, the generation section generates the UL signal by using code resources associated with values of the UL control information and presence/absence of a scheduling request, and, when not reporting the UL control information but reporting the scheduling request, the generation section generates the UL signal by using a specific code resource.

Advantageous Effects of Invention

According to the present invention, UL control information can be reported properly in future radio communication systems.

DESCRIPTION OF EMBODIMENTS

Figure 1A:
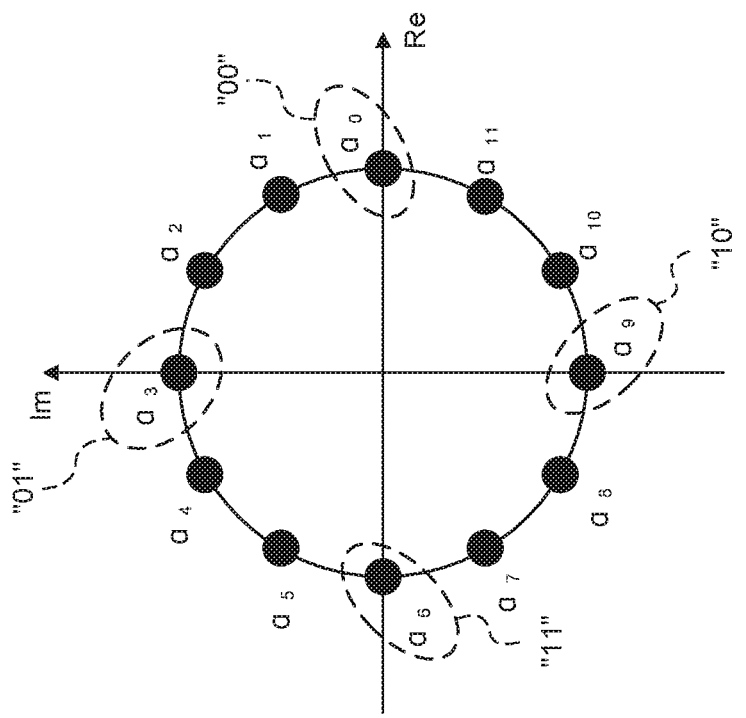
FIGS. 1A and 1B are diagrams to show examples of sets of phase rotation amounts for sequence-based PUCCH.

Future radio communication systems (for example, LTE Rel. 14, 15 and/or later versions, 5G, NR, etc.) are under study to introduce multiple numerologies, not a single numerology.

Note that a "numerology" may refer to a set of communication parameters that characterize the design of signals in a given RAT (Radio Access Technology), the design of a RAT and so on, or refer to parameters that are defined in the frequency direction and/or the time direction, such as subcarrier spacing (SCS), the duration of symbols, the duration of cyclic prefixes, the duration of subframes, and so forth.

Also, future radio communication systems are under research for introduction of time units (also referred to as "subframes," "slots," "minislots," "subslots," "transmission time intervals (TTIs)," "short TTIs (sTTIs)" "radio frames" and so on) that are the same as and/or different than existing LTE systems (LTE Rel. 13 or earlier versions), while supporting multiple numerologies and so on.

Note that TTIs may represent time units in which transmitting/receiving data's transport blocks, code blocks, codewords and so on are transmitted and received. Given a TTI, the period of time (for example, the number of symbols) where a transport block, a code block and/or a codeword of data is actually mapped may be shorter than the TTI.

For example, when a predetermined number of symbols (for example, fourteen symbols) constitute a TTI, transmitting/receiving data's transport block, code block and/or codeword can be transmitted and received in a period of one or a predetermined number of symbols in the constituent symbols. If the number of symbols in which a transport block, a code block and/or a codeword of transmitting/receiving data is transmitted and/or received is smaller than the number of symbols constituting a TTI, reference signals, control signals and so forth can be mapped to symbols in the TTI where no data is mapped.

Subframes may serve as time units that have a predetermined time duration (for example, 1 ms), irrespective of which numerology is used by (and/or configured in) a user terminal (for example, UE (User Equipment)).

By contrast with this, slots may serve as time units that depend on the numerology UE uses. For example, if the subcarrier spacing is 15 kHz or 30 kHz, the number of symbols per slot may be seven or fourteen. When the subcarrier spacing is 60 kHz or greater, the number of symbols per slot may be fourteen. In addition, a slot may contain a plurality of minislots (subslots).

Envisaging such future radio communication systems, a study is in progress to support a UL control channel (hereinafter also referred to as a "short PUCCH") that is designed to be shorter in duration (have a shorter duration) than PUCCH (Physical Uplink Control CHannel) formats for existing LTE systems (for example, LTE Rel. 8 to 13) and/or a UL control channel (hereinafter also referred to as a "long PUCCH") that is designed to have be longer in duration (have a longer duration) than the above short duration.

A short PUCCH (also referred to as a "shortened PUCCH") is formed with a predetermined number of symbols (for example, one symbol, two symbols, or three symbols) provided in a given SCS. In this short PUCCH, uplink control information (UCI) and reference signals (RSs) may be time-division-multiplexed (TDM) or frequency-division-multiplexed (FDM). The RSs may include, for example, the demodulation reference signal (DMRS), which is used to demodulate UCI.

The SCS in each symbol of the short PUCCH may be the same as or higher than the SCS in symbols of data channels (hereinafter also referred to as "data symbols"). The data channels may be, for example, a downlink data channel (PDSCH (Physical Downlink Shared CHannel)), an uplink data channel (PUSCH (Physical Uplink Shared CHannel)) and so on.

Hereinafter, whenever "PUCCH" is simply mentioned, this may be read as "short PUCCH" or "PUCCH in short duration."

PUCCH may be time-division-multiplexed (TDM) and/or frequency-division-multiplexed (FDM) with a UL data channel (hereinafter also referred to as "PUSCH") in a slot. Also, PUCCH may be time-division-multiplexed (TDM) and/or frequency-division-multiplexed (FDM) with a DL data channel (hereinafter also referred to as "PDSCH") and/or a DL control channel (hereinafter also referred to as "PDCCH (Physical Downlink Control CHannel)") in a slot.

To provide schemes for transmitting short PUCCHs, a DMRS-based PUCCH (DMRS-based transmission or DMRS-based PUCCH), which reports UCI by transmitting UL signals, in which DMRSs and UCI are time-division-multiplexed (TDM), and a sequence-based PUCCH (or sequence-based transmission), which reports UCI by transmitting UL signals using code resources that are associated with UCI values, without using DMRSs, are under study.

A DMRS-based PUCCH transmits a PUCCH that contains the RS for demodulating UCI, and therefore may be referred to as "coherent transmission," "coherent design," and so on. A sequence-based PUCCH reports UCI in a PUCCH that does not contain the RS for demodulating UCI, and therefore may be referred to as "non-coherent transmission," "non-coherent design" and so on.

A sequence-based PUCCH transmits UL signals that use code resources associated with UCI values. A code resource refers to a resource that can be code-division-multiplexed (CDM), and may be at least one of a base sequence, the cyclic shift amount (phase rotation amount) and an OCC (Orthogonal Cover Code). A cyclic shift may be read as a phase rotation.

Information related to code resources (for example, code resource candidates, phase rotation amount candidates, and so forth) may be reported from the network (NW, which is, for example, a base station, a gNodeB, etc.) to UE via higher layer signaling (for example, RRC (Radio Resource Control) signaling, MAC (Medium Access Control) signaling, broadcast information (the MIB (Master Information Block), SIBs (System Information Blocks), etc.) or physical layer signaling (for example, DCI), or by combining these.

Base sequences may be CAZAC (Constant Amplitude Zero Auto-Correlation) sequences (for example, Zadoff-Chu sequences), or may be sequences that are equivalent to CAZAC sequences (for example, CG-CAZAC (Computer- Generated CAZAC) sequences), such as ones specified in 3GPP TS 36.211 § 5.5.1.2 (in particular, table 5.5.1.2-1 and table 5.5.1.2-2).

Now, a case will be described below, in which a sequence-based PUCCH transmits two-bit UCI by using cyclic shifts. A number of candidates that are assigned to one UE will be referred to as "phase rotation amount candidates (also referred to as "phase rotation amount pattern," and/or the like)."

Figure 1B:
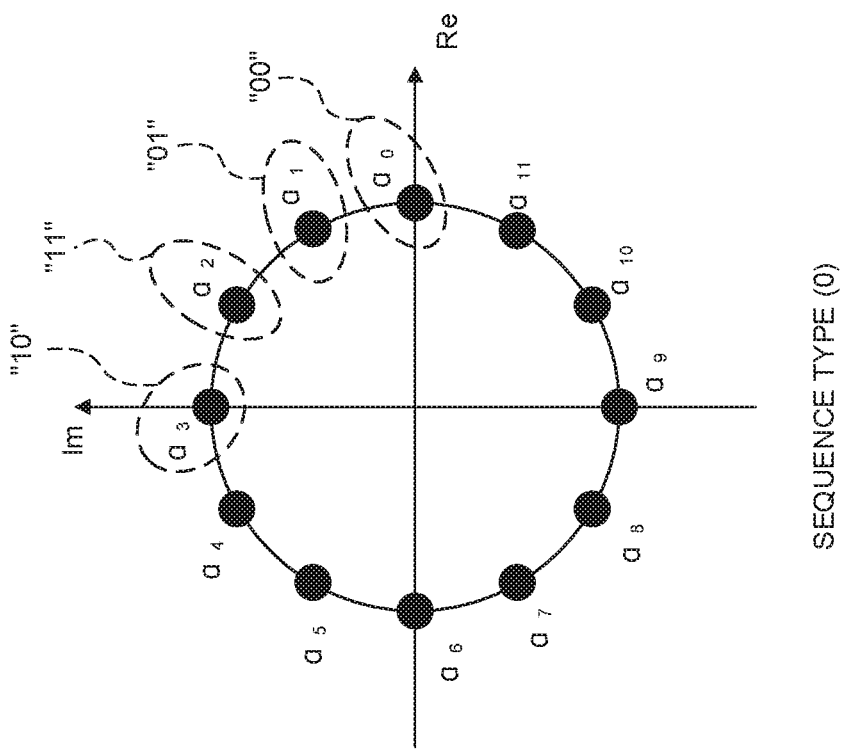

The sequence length of a base sequence is determined by the number of subcarriers M and the number of PRBs (Physical Resource Blocks). When a sequence-based PUCCH is transmitted using a unit band of one PRB, the sequence length of the base sequence is 12 (=12×1). In this case, as shown in FIGS. 1A and 1B, twelve phase rotation amounts $\alpha_0$ to $\alpha_{11}$, which are provided at phase intervals of $2\pi/12$ (that is, $\pi/6$) are defined. By applying phase rotations (cyclic shifts) to one base sequence based on phase rotation amounts $\alpha_0$ to $\alpha_{11}$, individually, twelve sequences that are orthogonal to each other (with zero cross-correlation) are derived. Note that phase rotation amounts $\alpha_0$ to $\alpha_{11}$ have only to be determined based on at least one of the number of subcarriers M, the number of PRBs and the sequence length of the base sequence. Two or more phase rotation amounts may be selected from these phase rotation amounts $\alpha_0$ to $\alpha_{11}$ and used as phase rotation amount candidates.

The phase rotation amount candidates for sequence type (0), shown in FIG. 1A, include a number of neighboring (continuous) phase rotation amounts. These phase rotation amount candidates include four phase rotation amounts $\alpha_0$, $\alpha_1$, $\alpha_2$ and $\alpha_3$, each spaced apart by $\pi/6$. The phase rotation amount candidates for sequence type (1), shown in FIG. 1B, include a number of phase rotation amounts that are apart from one another. The gap between two neighboring phase rotation amounts is the greatest in these phase rotation amount candidates, where four phase rotation amounts $\alpha_0$, $\alpha_3$, $\alpha_6$ and $\alpha_9$, each spaced apart by $\pi/2$, are included.

In an environment that is little frequency-selective, both sequence type (0) and sequence type (1) show little cross-correlation (that is to say, sequences generated from each sequence type do not interfere with each other). Therefore, in an environment that is little frequency-selective, sequence type (0) and sequence type (1) have an equal UCI error rate. When sequence type (0) is used, twelve phase rotation amounts can be provided more densely, so that three UEs can each use four phase rotation amounts, allowing more efficient use of phase rotation amounts.

On the other hand, in an environment that is severely frequency-selective, there is significant cross-correlation between sequences that are generated by using neighboring phase rotation amounts, and therefore UCI produces more errors. It then follows that, in the event frequency selectivity is severe, using sequence type (1) can lower the UCI error rate more than when using sequence type (0).

Figure 2:
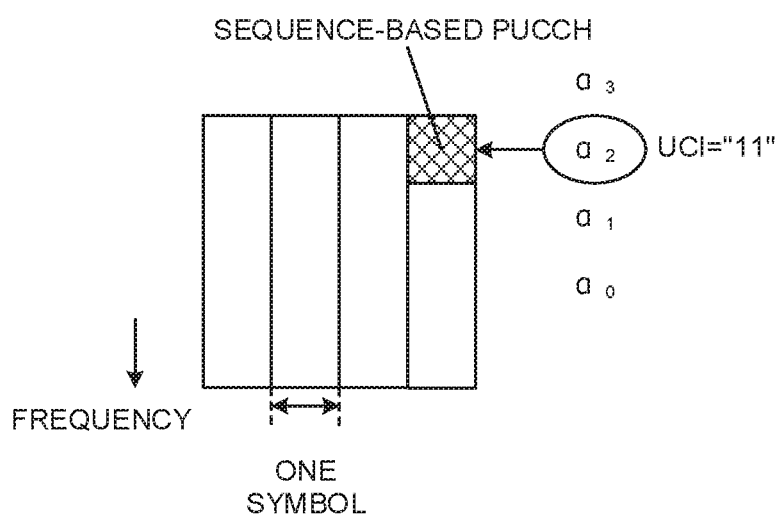
FIG. 2 is a diagram to show an example of a time/frequency resource for sequence-based PUCCH.

As shown in FIG. 2, where there are four candidates of two-bit-UCI values, UE rotates the phase of a base sequence by using a phase rotation amount that corresponds to the transmitted value, and transmits the signal of the rotated phase using a given time/frequency resource. The time/frequency resource may be a time resource (for example, a subframe, a slot, a symbol, etc.) and/or a frequency resource (for example, a carrier frequency, a channel band, a CC (Component Carrier), a PRB, etc.).

FIG. 3 provide diagrams to show examples of transmission signal generation processes for sequence-based PUCCHs. In these transmission signal generation processes, phase rotations (cyclic shifts) are applied to base sequences $X_0$ to $X_{M-1}$ of sequence length M, based on selected phase rotation amounts $\alpha$, and the phase-rotated base sequences are input to an OFDM (Orthogonal Frequency Division Multiplexing) transmitter or a DFT-S-OFDM (Discrete Fourier Transform-Spread-Orthogonal Frequency Division Multiplexing) transmitter. The UE transmits output signals from the OFDM transmitter or the DFT-S-OFDM transmitter.

Figure 3B:
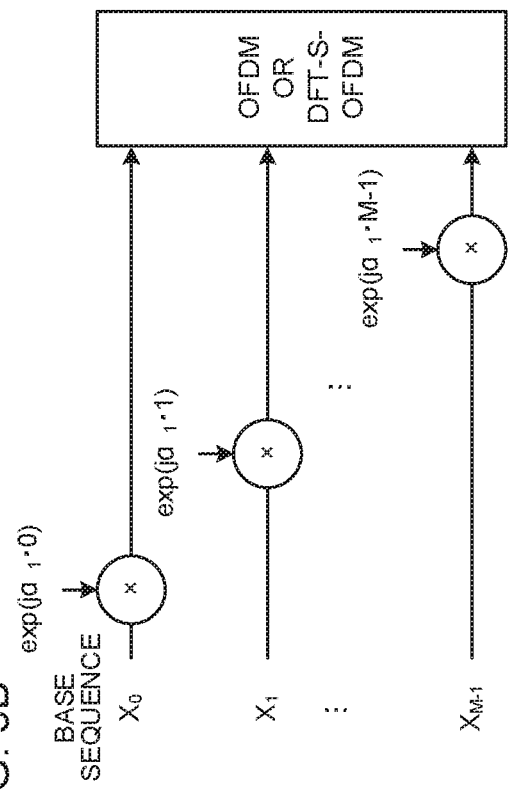
FIGS. 3A to 3D are diagrams to show examples of transmission signal generation processes for sequence-based PUCCH.
Figure 3D:
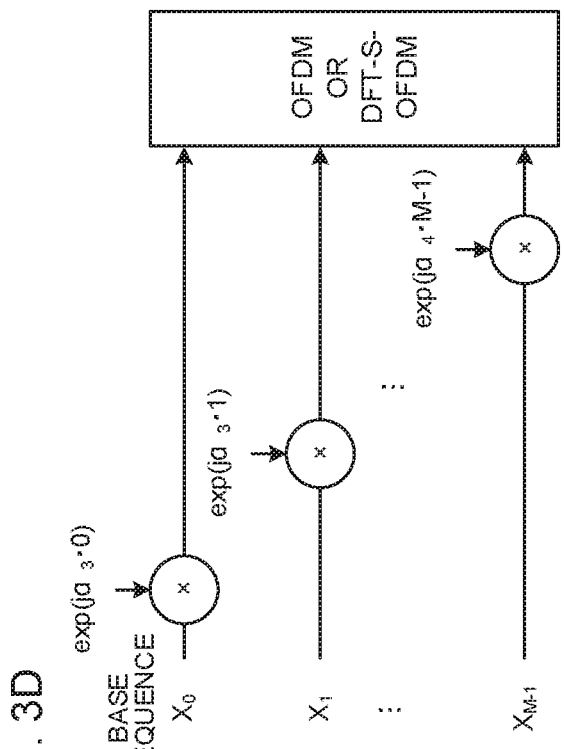
Figure 3A:
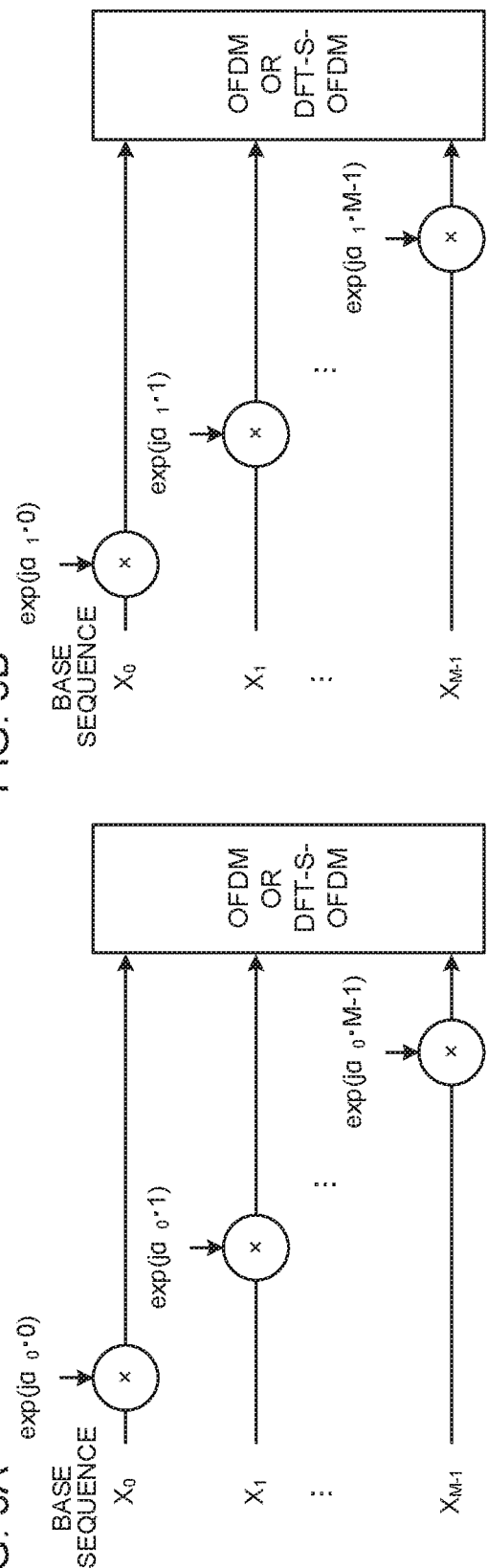
Figure 3C:
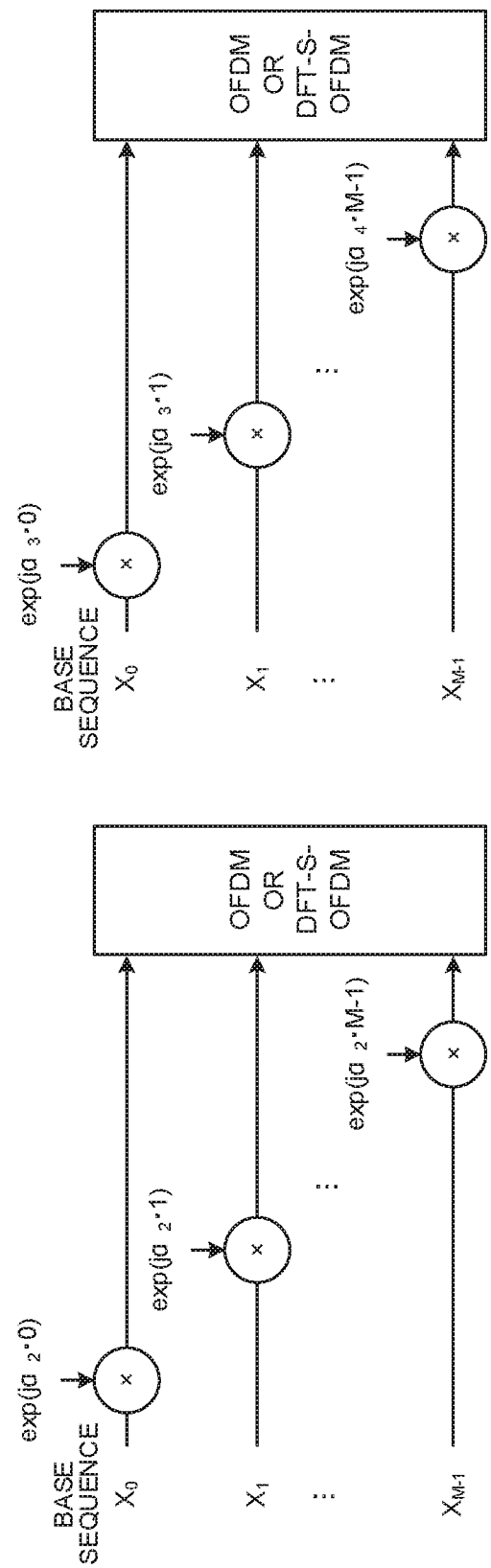

When phase rotation amount candidates $\alpha_0$ to $\alpha_3$ are associated with UCI information candidates 0 to 3, respectively, and information 0 is reported as UCI, as shown in FIG. 3A, the UE rotates the phases of base sequences $X_0$ to $X_{M-1}$ based on $\alpha_0$, which is the phase rotation amount associated with information 0. Similarly, when the UE reports information 1 to 3 as UCI, as shown in FIGS. 3B, 3C and 3D, the UE rotates the phases of base sequences $X_0$ to $X_{M-1}$ based on $\alpha_1$, $\alpha_2$ and $\alpha_3$, which are the phase rotation amounts associated with information 1 to 3, respectively.

Next, decoding of UCI that is reported in a sequence-based PUCCH will be described below. Here, although the receipt detection operation to be carried out when UCI is reported by selecting the phase rotation amount will be described below, the same operation will apply even when UCI is reported by selecting different types of resources (for example, base sequences, time/frequency resources, etc.) or combinations of multiple types of resources.

The NW may detect UCI from a received signal by using maximum likelihood detection (which may be referred to as "MLD" or "correlation detection"). To be more specific, the network may generate a replica of every phase rotation amount (phase rotation amount replicas) that is assigned to the user terminal (for example, the network may generate four patterns of phase rotation amount replicas if the length of the UCI payload is two bits), and generate transmission signal waveforms, as the user terminal does, based on the base sequences and the phase rotation amount replicas. Also, the network may calculate the correlation between the transmission signal waveforms derived thus, and the waveform of the signal as received from the user terminal, for all the phase rotation amount replicas, and assume that the phase rotation amount replica to show the highest correlation has been transmitted.

To be more specific, the network may multiply each element of received signal sequences of size M after the DFT (M complex-number sequences) by complex conjugates of transmission signal sequences (M complex-number sequences), which are given by applying phase rotations to the base sequence of the transmission signal based on phase rotation amount replicas, and assume that the phase rotation amount replica, where the resultant absolute value (or the square of the absolute values) of the sum of the M sequences is the largest, has been sent.

Alternatively, the network may generate transmission signal replicas to match the maximum number of phase rotation amounts that can be assigned (twenty-four amounts for two PRBs), and estimate the phase rotation amount to yield the highest correlation with the received signal, based on the same operation as the MLD-based operation described above. When the phase rotation amount estimated thus is not included in the phase rotation amounts assigned, it is possible to assume that the one that is closest to the estimated value among the assigned phase rotation amounts has been transmitted.

Now, cases will be described below, in which no SR is contained in UCI. UCI contains, for example, at least one of ACK/NACK (A/N) and CSI.

Next, a sequence-based PUCCH, in which UCI and the presence/absence of an SR are multiplexed and reported, will be described below. Here, the sequence-based PUCCH reports UCI in two bits and the presence/absence of an SR in one bit. The case where an SR is present when the sequence-based PUCCH is transmitted will be labelled as "POSITIVE SR," and the case where no SR is present when the sequence-based PUCCH is transmitted will be labelled as "NEGATIVE SR." Also, the case where there is UCI to report when the sequence-based PUCCH is transmitted will be labelled as "WITH UCI," and the case where there is no UCI to report when the sequence-based PUCCH is transmitted will be labelled as "WITHOUT UCI."

Figure 4A:
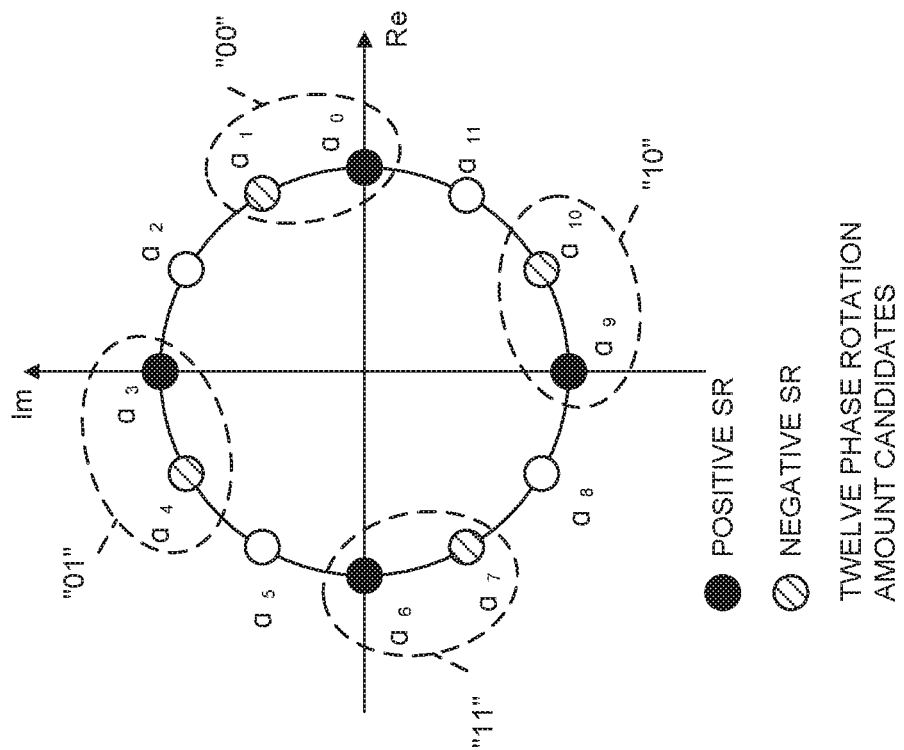
FIGS. 4A and 4B are diagrams to show examples of phase rotation amount candidates for reporting UCI and SR.

When a sequence-based PUCCH has a bandwidth of two PRBs or more, the sequence-based PUCCH can use a sequence of sequence length 24 using at least twenty-four subcarriers, so that twenty-four cyclic shift amounts (phase rotation amounts) can be used. In this case, for example, as shown in FIG. 4A, for the UE, the two-bit-UCI values 00, 01, 11 and 10 for when an SR is present are assigned phase rotation amount candidates $\alpha_0$, $\alpha_6$, au and $\alpha_{18}$, respectively, and the two-bit-UCI values 00, 01, 11, and 10 for when no SR is present are assigned phase rotation amount candidates $\alpha_1$, $\alpha_7$, $\alpha_{13}$, and $\alpha_{19}$, respectively. The UE transmits the sequence-based PUCCH based on the phase rotation amount corresponding to the combination of the UCI value and the presence/absence of an SR among the eight phase rotation amount candidates assigned.

Figure 4B:
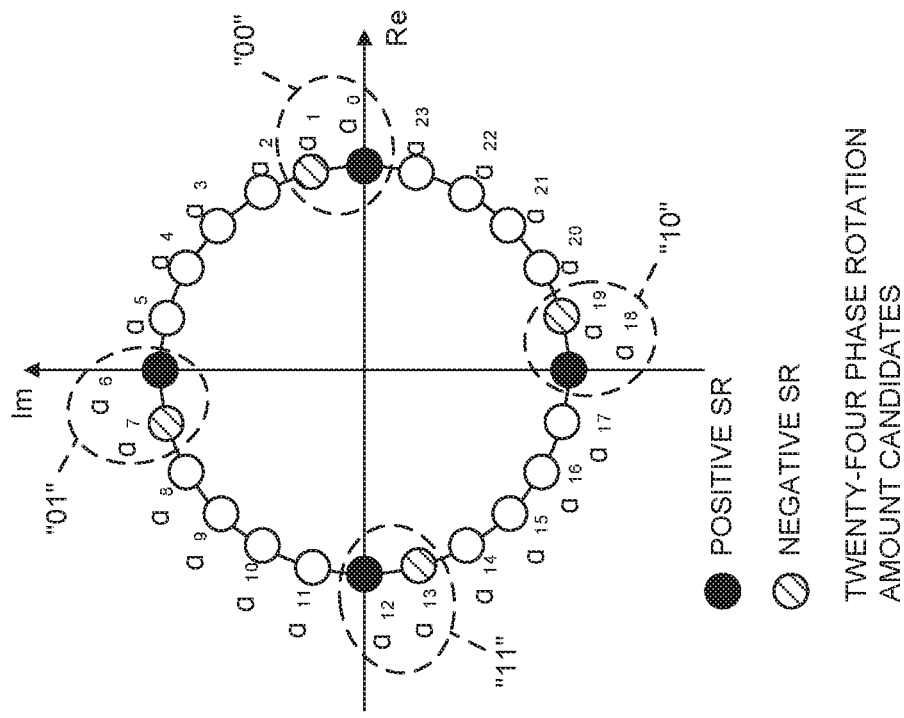

If the bandwidth of the sequence-based PUCCH is one PRB or more, the sequence-based PUCCH can use a sequence of sequence length 12 using at least twelve subcarriers, so that twelve cyclic shift amounts (phase rotation amounts) can be used. In this case, for example, as shown in FIG. 4B, for the UE, the two-bit-UCI values 00, 01, 11 and 10 for when an SR is present are assigned phase rotation amount candidates $\alpha_0$, $\alpha_3$, $\alpha_6$ and $\alpha_9$, respectively, and the two-bit-UCI values 00, 01, 11, and 10 for when no SR is present are assigned phase rotation amount candidates $\alpha_1$, $\alpha_4$, $\alpha_7$ and $\alpha_{10}$, respectively. The UE transmits the sequence-based PUCCH based on the phase rotation amount corresponding to the combination of the UCI value and the presence/absence of an SR among the eight phase rotation amount candidates assigned.

The base station, for example, detects the value of UCI and the presence/absence of an SR by executing MLD on the received sequence-based PUCCH.

The requirement for the error rate of UCI may be more stringent than the requirement for the error rate of the presence/absence of an SR. According to the assignments of phase rotation amount candidates of FIGS. 4A and 4B, compared to the gap between two phase rotation amount candidates, corresponding to the presence and absence of an SR, respectively, the gap between two phase rotation amount candidates corresponding to two different UCI values is large, so that, in an environment that is severely frequency-selective, it is possible to lower the error rate of UCI compared with the SR error rate.

Note that, even if the sequence-based PUCCH has a bandwidth of two or more PRBs, the phase rotation amounts for use may be limited to twelve. In this way, the gap between two phase rotation amount candidates corresponding to the presence and absence of an SR becomes wider, and the error rate performance of the presence/absence of an SR can be improved even in an environment where the frequency selectivity is severe.

In this way, a sequence-based PUCCH that multiplexes UCI and the presence/absence of an SR can report the presence/absence of an SR while keeping the error rate of UCI low.

When a sequence-based PUCCH multiplexes UCI and an SR, the sequence-based PUCCH reports different information depending on the timing of transmission. For example, there are cases where there is UCI to report and where there is none. The problem then lies in how to report an SR if there is no UCI to report. So, the present inventors have studied how to report an SR even when there is no UCI to report, and arrived at the present invention.

Now, embodiments of the present invention will be described in detail below with reference to the accompanying drawings. Note that the radio communication methods according to these embodiments may be applied individually or may be applied in combination.

(Radio Communication Method)

First Embodiment

According to the first embodiment of the present invention, if there is no UCI to report, UE will report the presence/absence of an SR by using a phase rotation amount that corresponds to a specific UCI value.

《Phase Rotation Amount Candidates for Use when there is No UCI》

This embodiment will assume that UCI is an A/N of two bits. The two-bit-UCI values 00, 01, 11 and 10 correspond to an "NACK-NACK," a "NACK-ACK," an "ACK-NACK" and an "ACK-ACK," respectively.

Figure 5A:
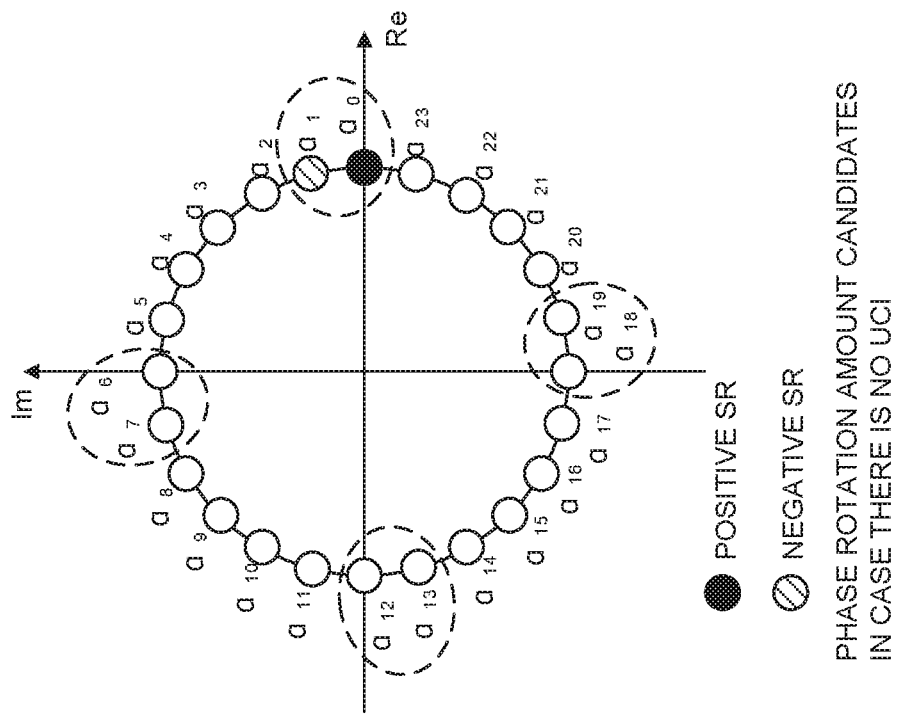
FIGS. 5A and 5B are diagrams to show examples of phase rotation amount candidates assigned to UE and phase rotation amount candidates for use when there is no UCI.

Here, as shown in FIG. 5A, assume that eight phase rotation amount candidates, out of twenty-four phase rotation amounts, are assigned to the UE, and reported from the NW to the UE, as in FIG. 4A. For example, the two-bit-UCI values 00, 01, 11 and 10 for when an SR is present are assigned phase rotation amount candidates $\alpha_0$, $\alpha_6$, $\alpha_{12}$ and $\alpha_{18}$, respectively, and the two-bit-UCI values 00, 01, 11, and 10 for when an SR is absent are assigned phase rotation amount candidates $\alpha_1$, $\alpha_7$, $\alpha_{13}$, and $\alpha_{19}$, respectively.

Note that eight phase rotation amount candidates, out of twelve phase rotation amounts, may be assigned to the UE as in FIG. 4B.

If UCI is there to be reported when transmitting the sequence-based PUCCH, The UE transmits the sequence-based PUCCH based on the phase rotation amount corresponding to the combination of the UCI value and the presence/absence of an SR.

Figure 5B:
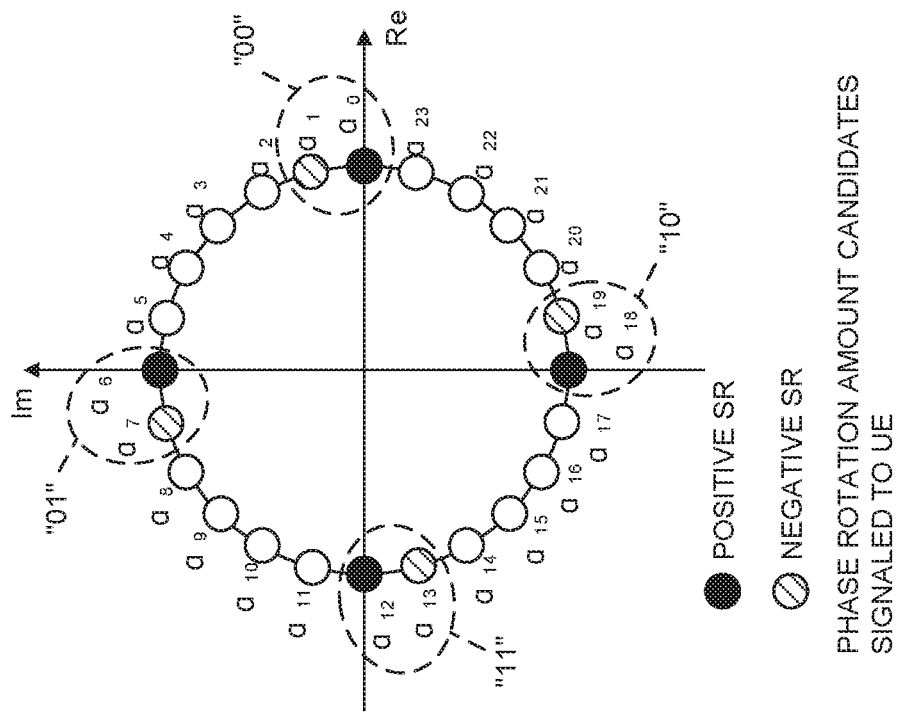

If there is no UCI to report when transmitting the sequence-based PUCCH, as shown in FIG. 5B, the UE transmits the sequence-based PUCCH based on the phase rotation amount corresponding to the UCI value 00, which represents a "NACK-NACK." For example, in the event there is an SR, the UE transmits the sequence-based PUCCH based on phase rotation amount $\alpha_0$, and, in the event there is no SR, the UE transmits the sequence-based PUCCH based on phase rotation amount $\alpha_1$.

Some of the phase rotation amount candidates for use when there is UCI overlap the phase rotation amount candidates for use when there is no UCI, so that code resources can be used efficiently. For example, when different phase rotation amount candidates are assigned to a plurality of UEs and a number of UEs' sequence-based PUCCHs are code-division-multiplexed (CDM), many UEs can be multiplexed. Also, for example, if one UE's sequence-based PUCCH and the DMRS for another UE's DMRS-based PUCCH are code-division-multiplexed (CDM), part of the phase rotation amount candidates for use when there is UCI overlap the phase rotation amount candidates for use when there is no UCI, so that more UEs can be multiplexed, and code resources can be used efficiently.

Also, given phase rotation amount candidates for use when there is UCI, the phase rotation amount candidate that corresponds to a specific UCI value may be used as a phase rotation amount candidate when there is no UCI, so that there is no need to report phase rotation amount candidates from the NW to the UE when there is no UCI, and the volume of information to report phase rotation amount candidates can be reduced.

When the base station receives UCI with resources allocated by DCI, or receives UCI indicating an A/N in response to DL data, the base station knows at what timing the UCI is received, so that the base station may perform MLD to determine which of the phase rotation amount candidates for use when there is UCI is the phase rotation amount for the sequence-based PUCCH received at that timing, and detect the value of UCI and the presence/absence of an SR. In addition, the base station may perform MLD to determine which phase rotation amount candidate for use when there is no UCI is the phase rotation amount for a sequence-based PUCCH that is received apart from the UCI-receiving timing, and detect whether an SR is present or absent.

If a sequence-based PUCCH is transmitted based on a phase rotation amount that is not associated with the UCI value 00 (that is, based on a phase rotation amount that is associated with a NACK-ACK, an ACK-ACK or an ACK-NACK) when there is no UCI, there is a possibility that the base station mistakes DTX (Discontinuous Reception) for an ACK (which is also referred to as a "DTX-to-ACK error"), or mistakes a NACK for an ACK (which is also referred to as a "NACK-to-ACK error").

For example, when the base station transmits DCI to indicate allocation of resources for UCI to the UE and yet the UE fails to detect the DCI and reports only an SR based on a phase rotation amount that is not associated with the UCI value 00 without even knowing that there is UCI to be transmitted, the base station, having allocated resources for UCI, judges that the sequence-based PUCCH represents an ACK. That is, the base station mistakes a NACK for an ACK ("NACK-to-ACK error").

Meanwhile, as shown in FIG. 5B, when there is no A/N to report, the UE can report the presence/absence of an SR by using the phase rotation amount corresponding to a NACK-NACK, thereby preventing the base station from erroneously detecting an ACK.

《 Sequence-Based PUCCH Transmission Method for Use when there is No UCI》

Now, two sequence-based PUCCH transmission methods for use when there is no UCI will be described below.

Figure 6A:
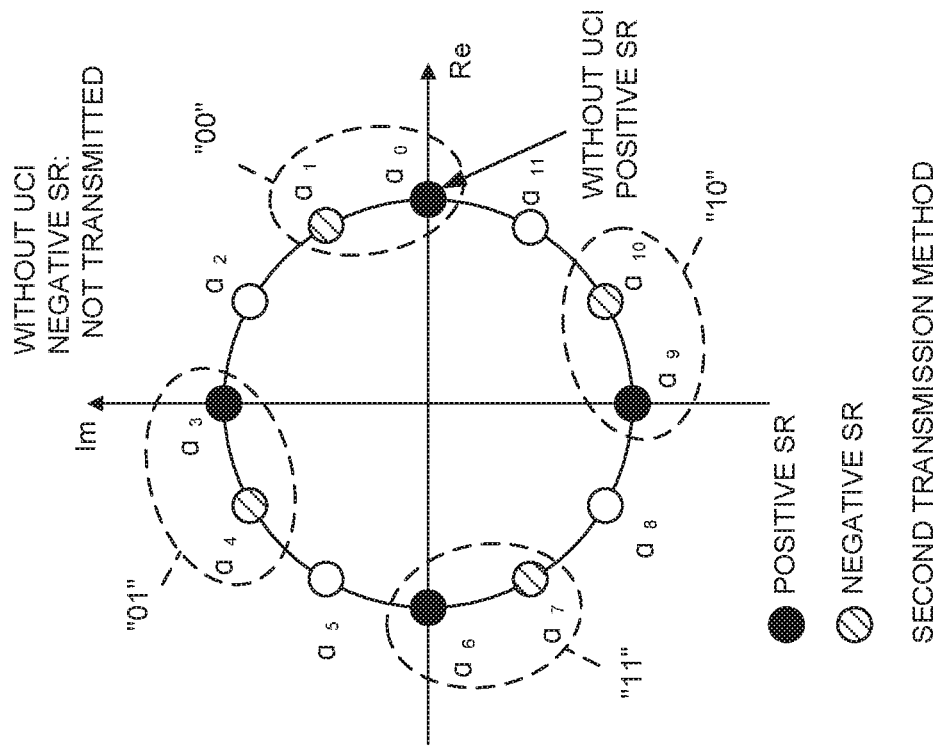
FIGS. 6A and 6B are diagrams to show examples of two sequence-based PUCCH transmission methods.

Here, as shown in FIG. 6A, assume that eight phase rotation amount candidates, out of twelve phase rotation amounts, are assigned to the UE and reported from the NW to the UE, as in FIG. 4B. For example, the two-bit-UCI values 00, 01, 11 and 10 for when an SR is present are assigned phase rotation amount candidates $\alpha_0$, $\alpha_3$, $\alpha_6$ and $\alpha_9$, respectively, and the two-bit-UCI values 00, 01, 11, and 10 for when no SR is present are assigned phase rotation amount candidates $\alpha_1$, $\alpha_4$, $\alpha_7$, and $\alpha_{10}$, respectively.

If UCI is there to be reported, the UE transmits a sequence-based PUCCH based on the phase rotation amount corresponding to the combination of the UCI value and the presence/absence of an SR among the eight phase rotation amount candidates.

According to the first transmission method, the sequence-based PUCCH is transmitted by using a predetermined time interval and a predetermined radio resource, even when there is no UCI and there is no SR. The predetermined time interval and/or the predetermined radio resource may be configured by the NW, or may be determined according to the specifications.

Also, if there is no UCI, the UE transmits the sequence-based PUCCH based on the phase rotation amount candidate that corresponds to the UCI value 00. That is, the UE transmits a sequence-based PUCCH based on phase rotation amount $\alpha_0$ when UCI is absent but an SR is present, and transmits a sequence-based PUCCH based on phase rotation amount $\alpha_1$ when UCI is absent and an SR is absent.

The base station detects the value of UCI and the presence/absence of an SR based on MLD. Even when UCI is absent, the base station may perform MLD to detect whether an SR is present or absent. In this way, it is possible to report the presence/absence of an SR with high accuracy.

Figure 6B:
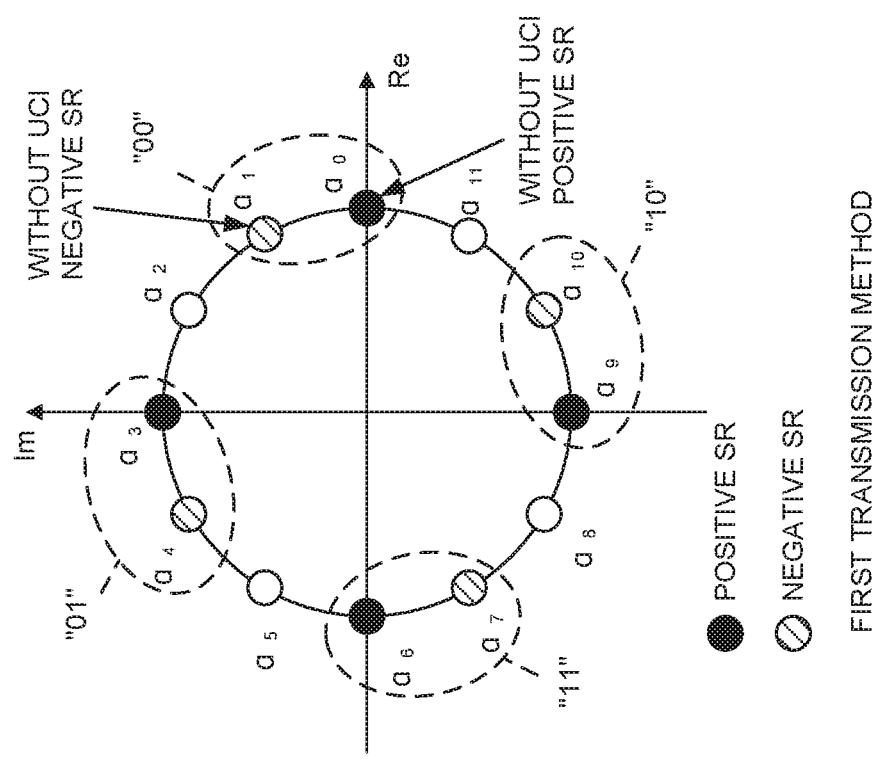

According to the second transmission method, a sequence-based PUCCH is not transmitted when UCI is absent and an SR is absent, and a sequence-based PUCCH is transmitted when UCI is present or when UCI is absent but an SR is present. For example, referring to FIG. 6B, when UCI is absent but an SR is present, the UE transmits a sequence-based PUCCH based on phase rotation amount $\alpha_0$, which corresponds to the UCI value 00 and "POSITIVE SR."

According to the second transmission method, unnecessary PUCCH transmission can be prevented, and the power efficiency and battery consumption of the UE can be improved.

In the event the second transmission method is used, when there is no UCI, the base station judges whether an SR is present or absent based on OOK (On Off Keying). Therefore, the error rate performance for the presence/absence of an SR that is yielded when using the first transmission method and MLD is better than the error rate performance of the presence/absence of an SR when using the second transmission method and OOK.

Which one of the first transmission method and the second transmission method is to be used may be informed from the NW through higher layer signaling, or may be decided based on specifications. For example, the error rate performance regarding the presence/absence of an SR is different between the first transmission method and the second transmission method, so that a UE with poor communication quality (limited coverage) may use the first transmission method, and a UE with good communication quality may use the second transmission method.

Second Embodiment

According to a second embodiment of the present invention, when there is no UCI to report, a phase rotation amount for use when there is an SR and a phase rotation amount for use when there is no SR do not neighbor each other.

To provide phase rotation amount candidates, like the phase rotation amount candidates in FIG. 6A, the two-bit-UCI values 00, 01, 11 and 10 for when an SR is present are assigned phase rotation amount candidates $\alpha_0$, $\alpha_3$, $\alpha_6$ and $\alpha_9$, respectively, and the two-bit-UCI values 00, 01, 11, and 10 for when no SR is present are assigned phase rotation amount candidates $\alpha_1$, $\alpha_4$, $\alpha_7$, and $\alpha_{10}$, respectively. If there is UCI, the UE transmits a sequence-based PUCCH based on the phase rotation amount corresponding to the combination of the UCI value and the presence/absence of an SR among the eight phase rotation amount candidates.

Figure 7:
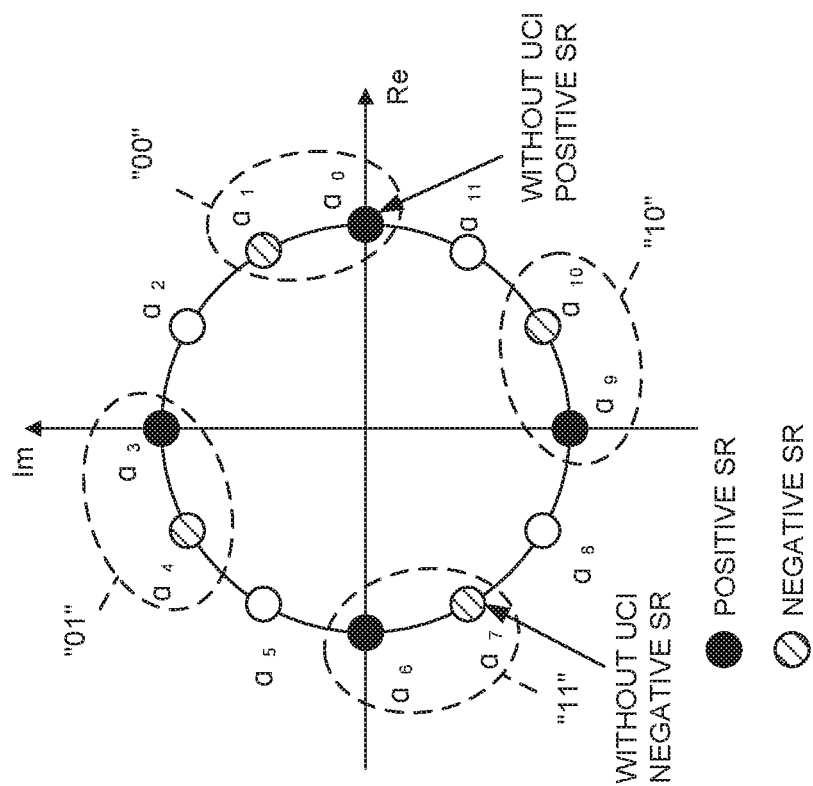
FIG. 7 is a diagram to show an example of phase rotation amount candidates for use when there is no UCI.

For example, referring to FIG. 7, when UCI is absent but an SR is present, the UE transmits a sequence-based PUCCH based on phase rotation amount $\alpha_0$, which corresponds to the UCI value 00 and "POSITIVE SR," and, when UCI is absent and an SR is absent, the UE transmits a sequence-based PUCCH based on phase rotation amount $\alpha_7$, which corresponds to the UCI value 11 and "NEGATIVE SR." That is, when there is no UCI, the gap between a phase rotation amount candidate for use in the presence of an SR and a phase rotation amount candidate for use in the absence of an SR is wider than in the first embodiment. In this way, the cross-correlation between a transmission signal when there is an SR and a transmission signal when there is no SR can be made lower than in the first embodiment, so that the error rate of the presence/absence of an SR when frequency selectivity is severe can be lowered.

The phase rotation amount for use when UCI is absent and an SR is absent is the same as the phase rotation amount for use when the value of UCI is 11 and an SR is absent are the same, so that, as has been described earlier with the first embodiment, if the base station transmits DCI to indicate allocation of resources to UCI to the UE and yet the UE fails to detect the DCI, a NACK-to-ACK error may occur. To cope with this, a design to reduce the DCI error rate can prevent the error rate from increasing. So, for example, the coding rate of the PDCCH may be lowered, the degree of transmission diversity may be increased, or the number of MIMO (Multi Input Multi Output) layers may be increased.

According to the second embodiment described above, while the required DCI error rate is lower than the first embodiment, it is still possible to improve the error rate of the presence/absence of an SR when there is no UCI.

Third Embodiment

In the third embodiment of the present invention, the UE uses different phase rotation amount candidates when there is UCI to report and when there is no UCI to report.

Figure 8A:
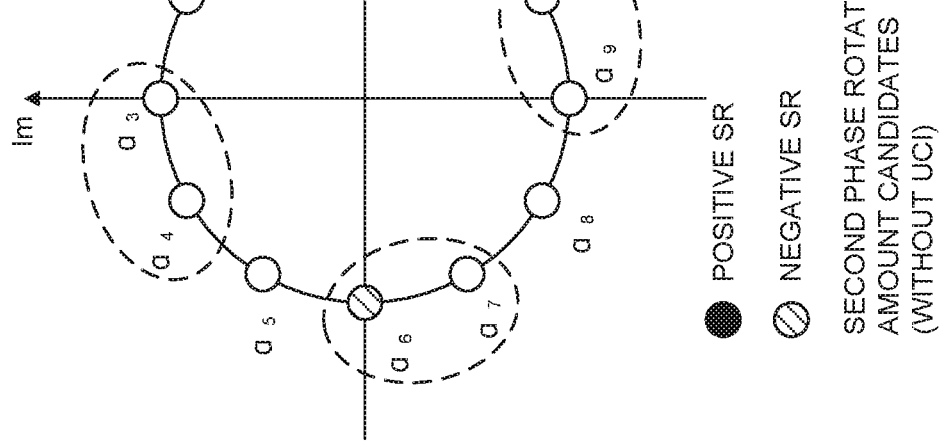
FIGS. 8A and 8B are diagrams to show examples of two phase rotation amount candidates for sequence-based PUCCH.
Figure 8B:
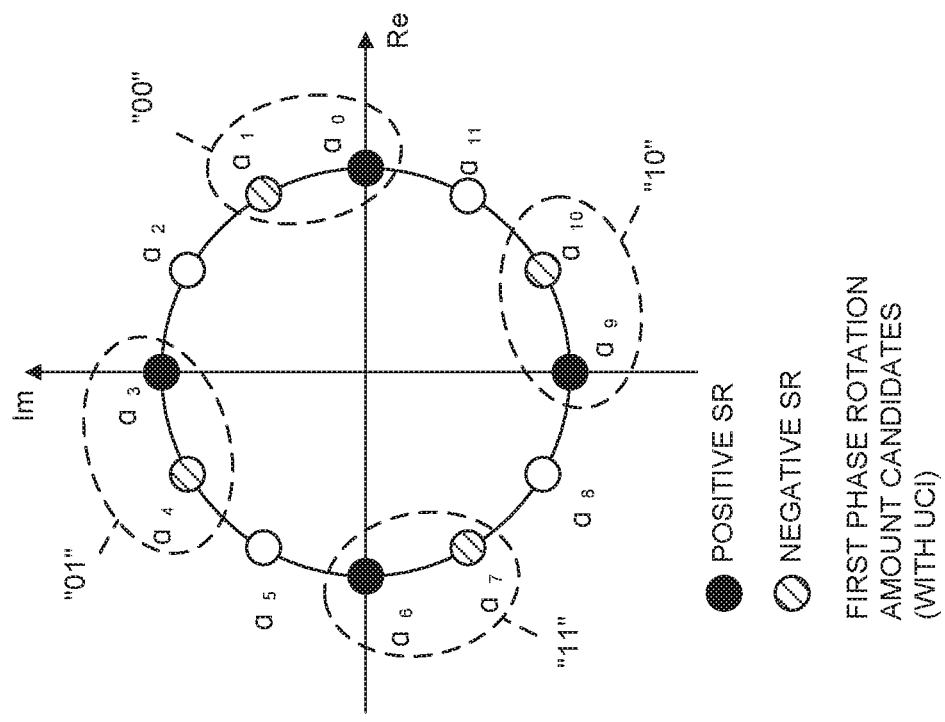

For example, the first phase rotation amount candidates shown in FIG. 8A, and the second phase rotation amount candidates shown in FIG. 8B are reported from the NW to UE. The UE selects the first phase rotation amount candidates if UCI is there to be reported, and selects the second phase rotation amount candidates when no UCI is there to be reported.

Similar to the phase rotation amount candidates shown in FIG. 6A and FIG. 7A, given the first phase rotation amount candidates, the two-bit-UCI values 00, 01, 11 and 10 for when an SR is present are assigned phase rotation amount candidates $\alpha_0$, $\alpha_3$, $\alpha_6$ and $\alpha_9$, respectively, and the two-bit-UCI values 00, 01, 11, and 10 for when no SR is present are assigned phase rotation amount candidates $\alpha_1$, $\alpha_4$, $\alpha_7$, and $\alpha_{10}$, respectively. If there is UCI, the UE transmits a sequence-based PUCCH based on the phase rotation amount corresponding to the combination of the UCI value and the presence/absence of an SR among the first phase rotation amount candidates.

As for the second phase rotation amount candidates, $\alpha_0$, which is the phase rotation amount candidate corresponding to "WITHOUT UCI" and "POSITIVE SR," and $\alpha_6$, which is the phase rotation amount candidate corresponding to "WITHOUT UCI" and "NEGATIVE SR," are assigned. When there is no UCI, the UE transmits a sequence-based PUCCH based on a phase rotation amount corresponding to the presence/absence of an SR among the second phase rotation amount candidates.

The second phase rotation amount candidates may include part of the first phase rotation amount candidates or may be part of the first phase rotation amount candidates. This makes it possible to reduce the number of phase rotation amount candidates to be assigned to one UE, so that code resources can be used efficiently.

Any two phase rotation amount candidates may be assigned to the presence and absence of an SR when there is no UCI.

The phase rotation amount candidates assigned to the presence and absence of an SR in the second embodiment are not ones that are the largest distance apart from one another (that is, the cross-correlation is the lowest). By contrast with this, the third embodiment can assign, to the presence and absence of an SR, phase rotation amounts that are the largest distance apart from one another. Thus, according to the third embodiment, the error rate of the presence/absence of an SR can be improved compared to the first embodiment and the second embodiment Given that the phase rotation amount for use when there is no UCI and there is no SR is the same as the phase rotation amount for use when the value of UCI is 11 and there is an SR, then, as described earlier with the first embodiment, if the base station transmits DCI to indicate allocation of resources to UCI to the UE and yet the UE fails to detect the DCI, a NACK-to-ACK error may occur. To cope with this, a design to reduce the DCI error rate can prevent the NACK-to-ACK error rate from increasing.

According to the third embodiment described above, while the required DCI error rate is lower than the first embodiment, it is still possible to improve the error rate of the presence/absence of an SR when there is no UCI.

(Others)

In each of the above-described embodiments, when there is UCI but there is no SR, UE transmits a sequence-based PUCCH by using a phase rotation amount candidate for use in the absence of an SR. This can prevent the base station from misjudging that an SR is present. For example, when there is no SR, UE to use the phase rotation amount candidates shown in FIG. 6A transmits sequence-based PUCCHs by using $\alpha_1$, $\alpha_4$, $\alpha_7$ and $\alpha_{10}$, which are the phase rotation amount candidates corresponding to the UCI values 00, 01, 11 and 10, respectively.

Although cases have been described with each embodiment above where UCI is two bits long, the length of UCI needs not be two bits. Furthermore, although cases have been described with the embodiments above where UCI is an A/N, other pieces of information such as CSI, the combination of an A/N and CSI and so forth may serve as UCI as well.

Although cases have been described with the embodiments above where combinations of UCI values and the presence/absence of an SR, or the presence/absence of an SR, are associated with phase rotation amounts, other code resources may be used as well by, for example, selecting varying base sequences, selecting varying orthogonal codes and so forth, instead of phase rotation amounts.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 9:
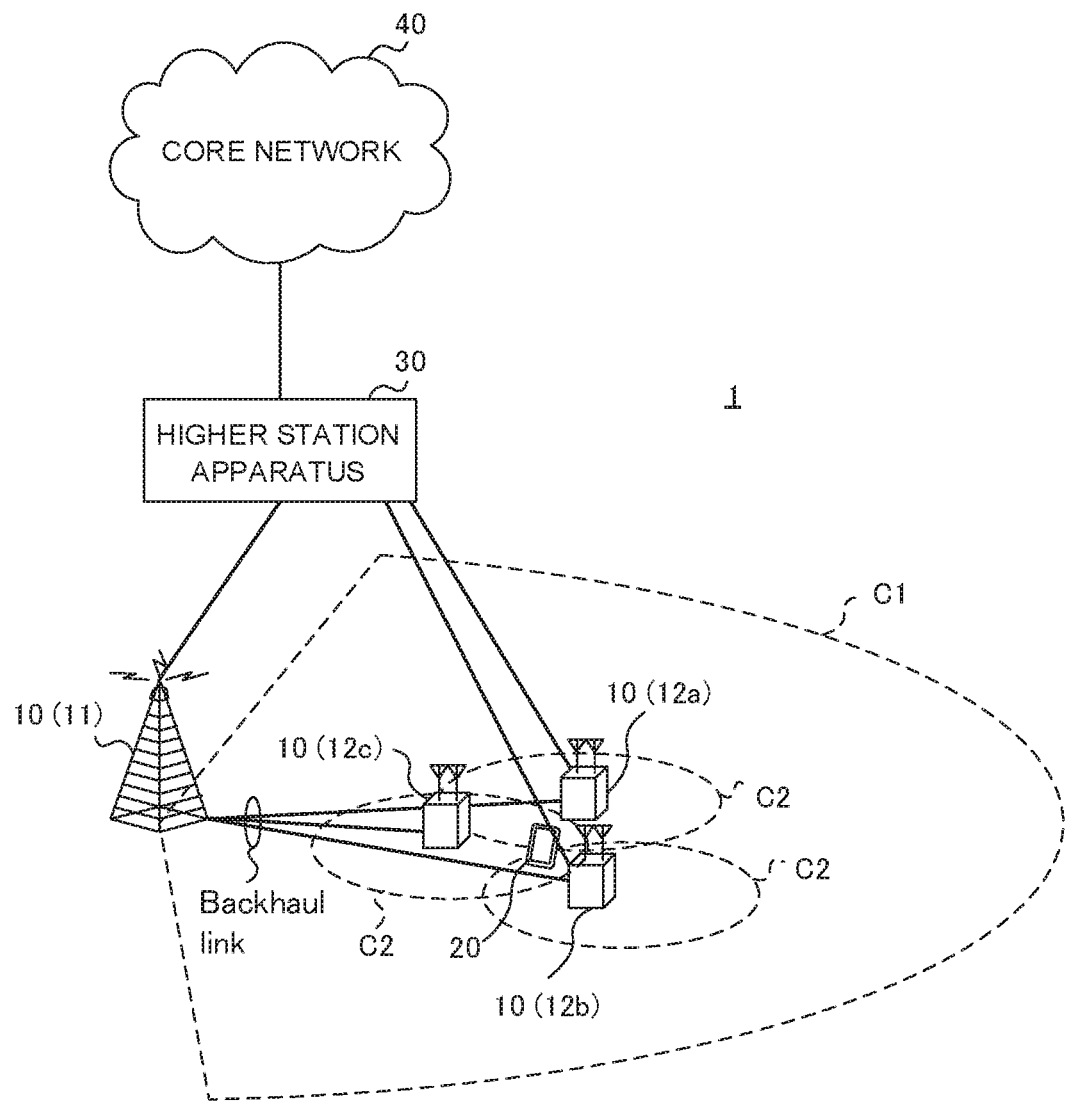
FIG. 9 is a diagram to show an exemplary schematic structure of a radio communication system according to one embodiment of the present invention.

FIG. 9 is a diagram to show an exemplary schematic structure of a radio communication system according to one embodiment of the present invention. A radio communication system 1 can adopt carrier aggregation (CA) and/or dual connectivity (DC) to group a number of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement, number and so on of cells and user terminals 20 are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a number of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, optical fiber, which is in compliance with the CPRI (Common Public Radio Interface), the X2 interface, and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on.

Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a number of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a number of terminals to use mutually different bands. Note that the radio access schemes for the uplink and the downlink are not limited to this combination, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, is communicated by the PDCCH.

Note that scheduling information may be reported via DCI. For example, DCI to schedule receipt of DL data may be referred to as "DL assignment," and DCI to schedule transmission of UL data may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 10:
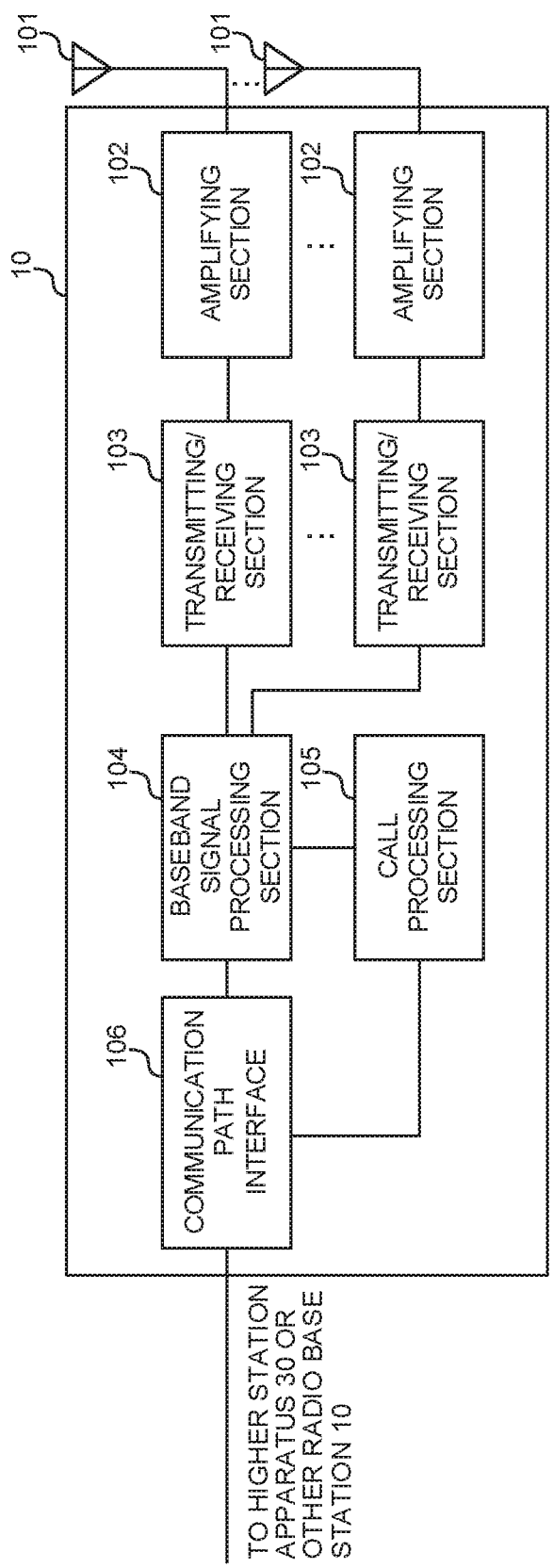
FIG. 10 is a diagram to show an exemplary overall structure of a radio base station according to one embodiment of the present invention.

FIG. 10 is a diagram to show an exemplary overall structure of a radio base station according to one embodiment of the present invention. A radio base station 10 has a number of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103.

Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Also, the transmitting/receiving sections 103 may receive a UL signal (for example, a sequence-based PUCCH) that contains UL control information (UCI) and/or a scheduling request (SR).

In addition, the transmitting/receiving sections 103 may transmit, to a user terminal 20, a plurality of code resources (for example, phase rotation amount candidates, first phase rotation amount candidates, and so forth) that are respectively associated with a plurality of candidates for UL control information values and the presence/absence of a scheduling request.

In addition, the transmitting/receiving sections 103 may transmit DL control information (DCI) to indicate allocation of radio resources (including, for example, any of time resources, frequency resources, and code resources) for UL control information.

Figure 11:
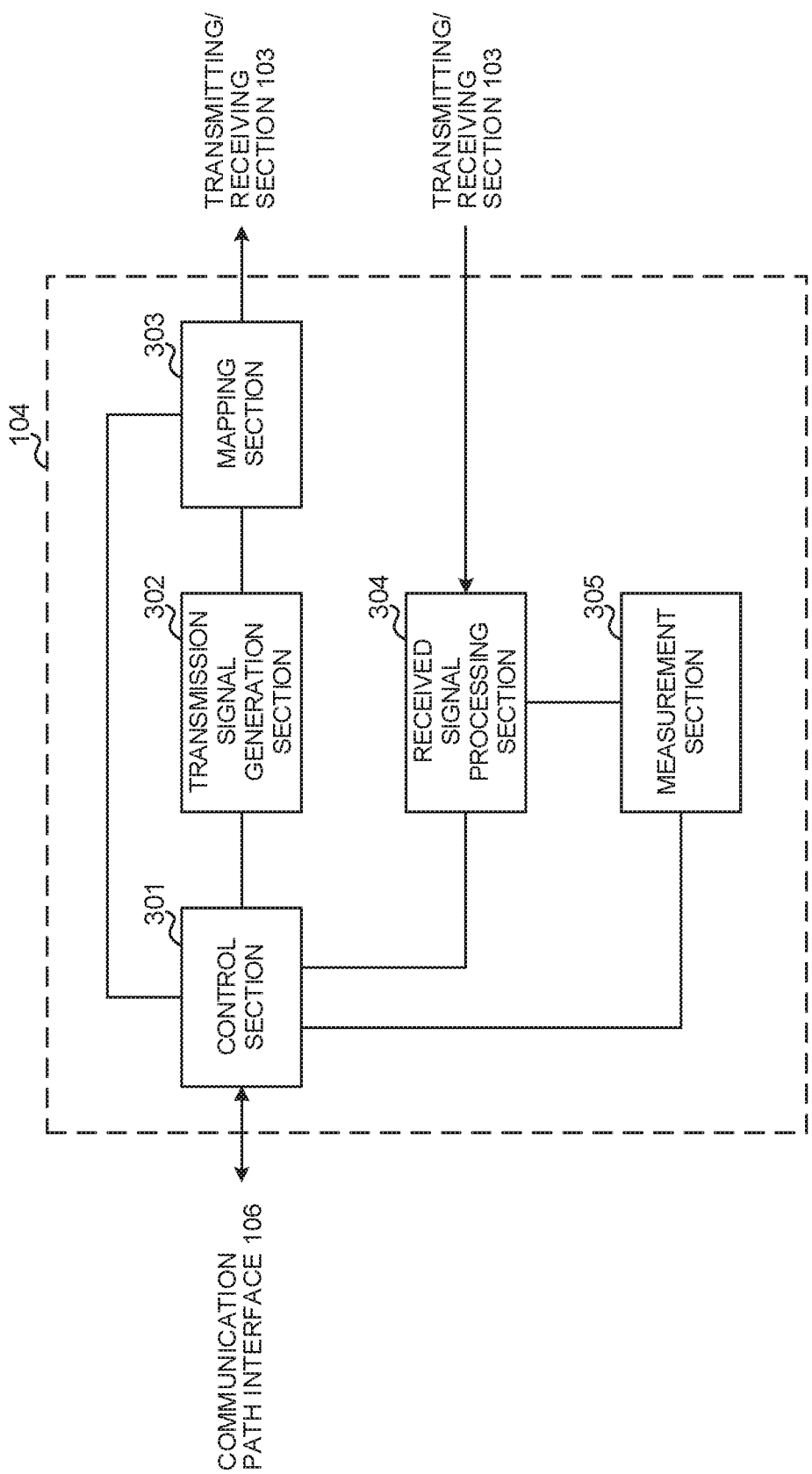
FIG. 11 is a diagram to show an exemplary functional structure of a radio base station according to one embodiment of the present invention.

FIG. 11 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

The control section 301 controls the scheduling of uplink data signals (for example, signals transmitted in the PUSCH), uplink control signals (for example, signals transmitted in the PUCCH and/or the PUSCH, such as delivery acknowledgment information), random access preambles (for example, signal transmitted in the PRACH), uplink reference signals, and so forth.

The transmission signal generation section 302 generates downlink signals (downlink control signals, downlink data signals, downlink reference signals and so on) as commanded from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, as commanded from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources as commanded from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

Also, the control section 301 may allocate radio resources for UL control information (UCI).

In addition, the control section 301 may allocate radio resources in response to a scheduling request (SR) from the user terminal 20.

Also, the control section 301 may detect UL control information (UCI) and/or a scheduling request (SR) based on a UL signal (for example, a sequence-based PUCCH).

(User Terminal)

Figure 12:
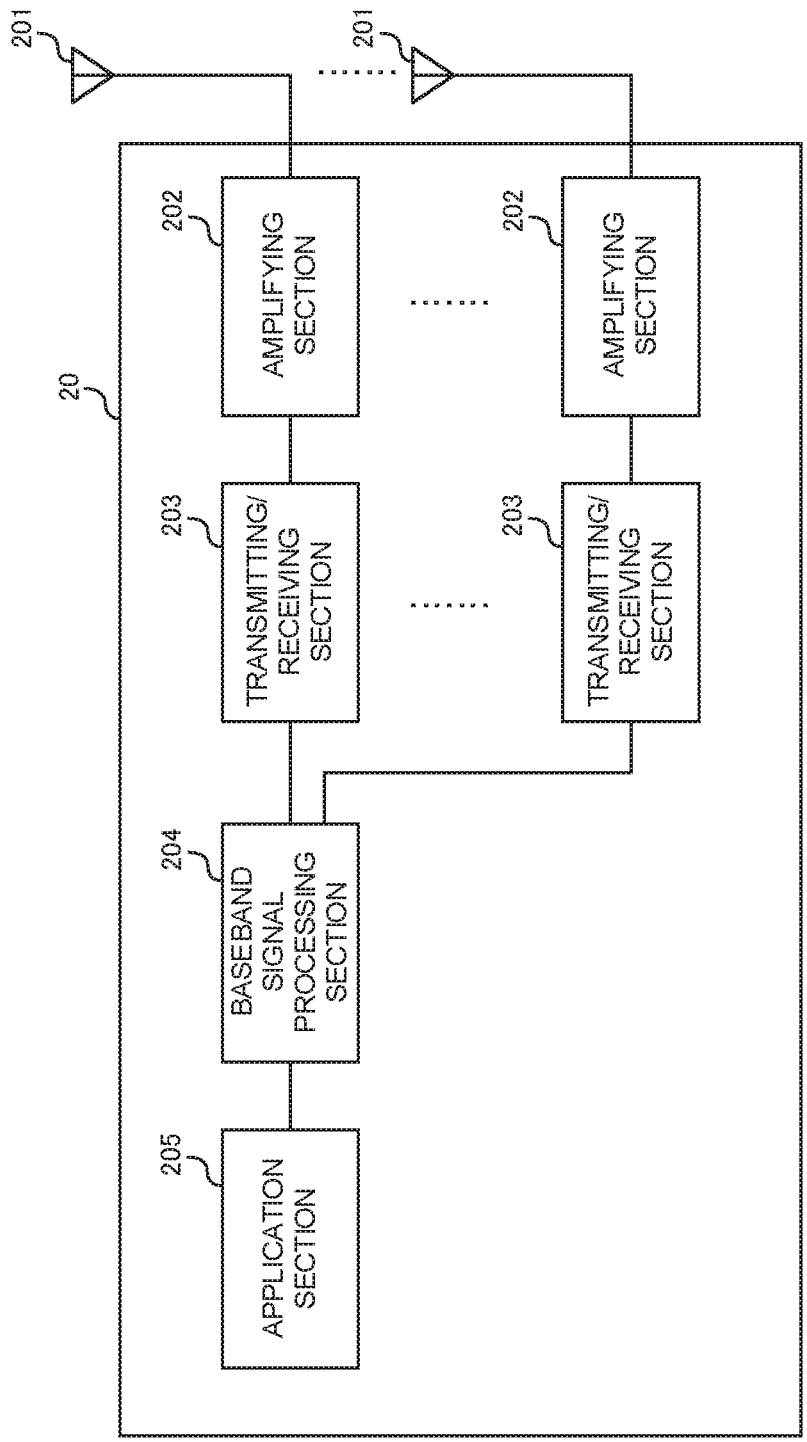
FIG. 12 is a diagram to show an exemplary overall structure of a user terminal according to one embodiment of the present invention.

FIG. 12 is a diagram to show an exemplary overall structure of a user terminal according to one embodiment of the present invention. A user terminal 20 has a number of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may transmit a UL signal (for example, a sequence-based PUCCH) that contains UL control information (UCI) and/or a scheduling request (SR).

Also, the transmitting/receiving sections 203 may receive, from the radio base station 10, a plurality of code resources (for example, phase rotation amount candidates, first phase rotation amount candidates, and so forth) that are respectively associated with a plurality of candidates for UL control information values and the presence/absence of a scheduling request.

In addition, the transmitting/receiving sections 203 may receive DL control information (DCI) to indicate allocation of radio resources (including, for example, any of time resources, frequency resources, and code resources) for UL control information.

Figure 13:
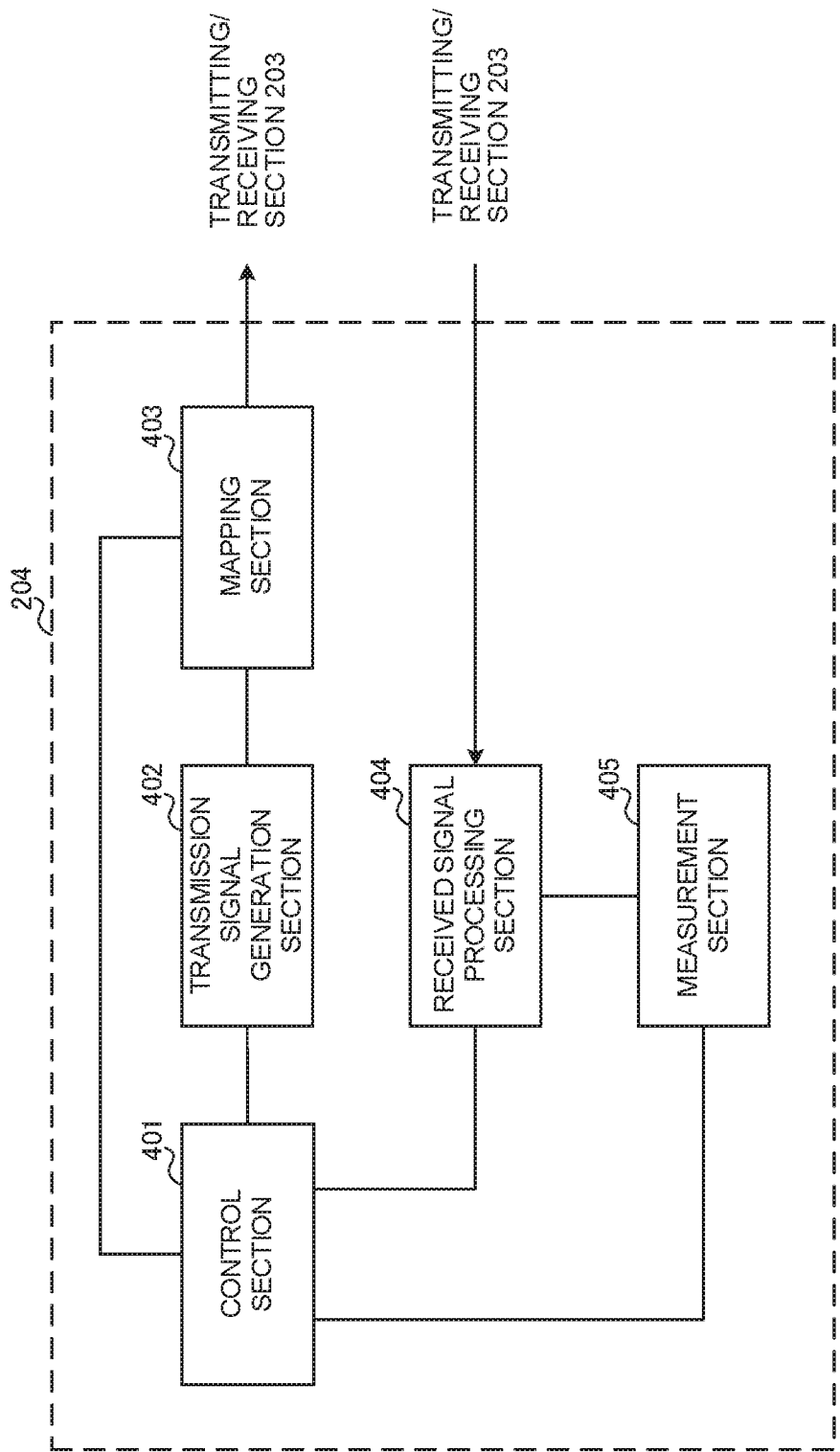
FIG. 13 is a diagram to show an exemplary functional structure of a user terminal according to one embodiment of the present invention.

FIG. 13 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) as commanded from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, as commanded from the control section 401. Also, the transmission signal generation section 402 generates uplink data signals as commanded from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources as commanded from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

In addition, when reporting UL control information, the transmission signal generation section 402 may generate a UL signal (for example, a sequence-based PUCCH) by using code resources (for example, a phase rotation amount) associated with the values of UL control information and the presence/absence of a scheduling request, and, when not reporting UL control information but reporting a scheduling request, generate a UL signal by using a specific code resource.

Further, the specific code resource may be one of a plurality of code resources (for example, phase rotation amount candidates, first phase rotation amount candidates, and so forth) that are respectively associated with a plurality of candidates for UL control information values and the presence/absence of a scheduling request.

In addition, the transmission signal generation section 402 may generate a UL signal by using a code resource that is configured, from the plurality of code resources, when not reporting UL control information but reporting the absence of a scheduling request. The code resource that is configured may be, for example, one of the phase rotation amount for use when the value of UCI is 00 and there is no SR, the phase rotation amount for use when the value of UCI is 11 and there is no SR, and the phase rotation amount for use when the value of UCI is 11 and there is an SR.

In addition, the transmission signal generation section 402 does not need to generate a UL signal when not reporting UL control information but reporting the absence of a scheduling request.

Also, the UL control information may include at least one piece of delivery acknowledgment information in response to a DL signal, and a specific code resource may be associated with a NACK (for example, a NACK-NACK).

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically integrated, or may be realized by directly and/or indirectly connecting two or more physically and/or logically separate pieces of apparatus (via wire or wireless, for example) and using these multiple pieces of apparatus.

Figure 14:
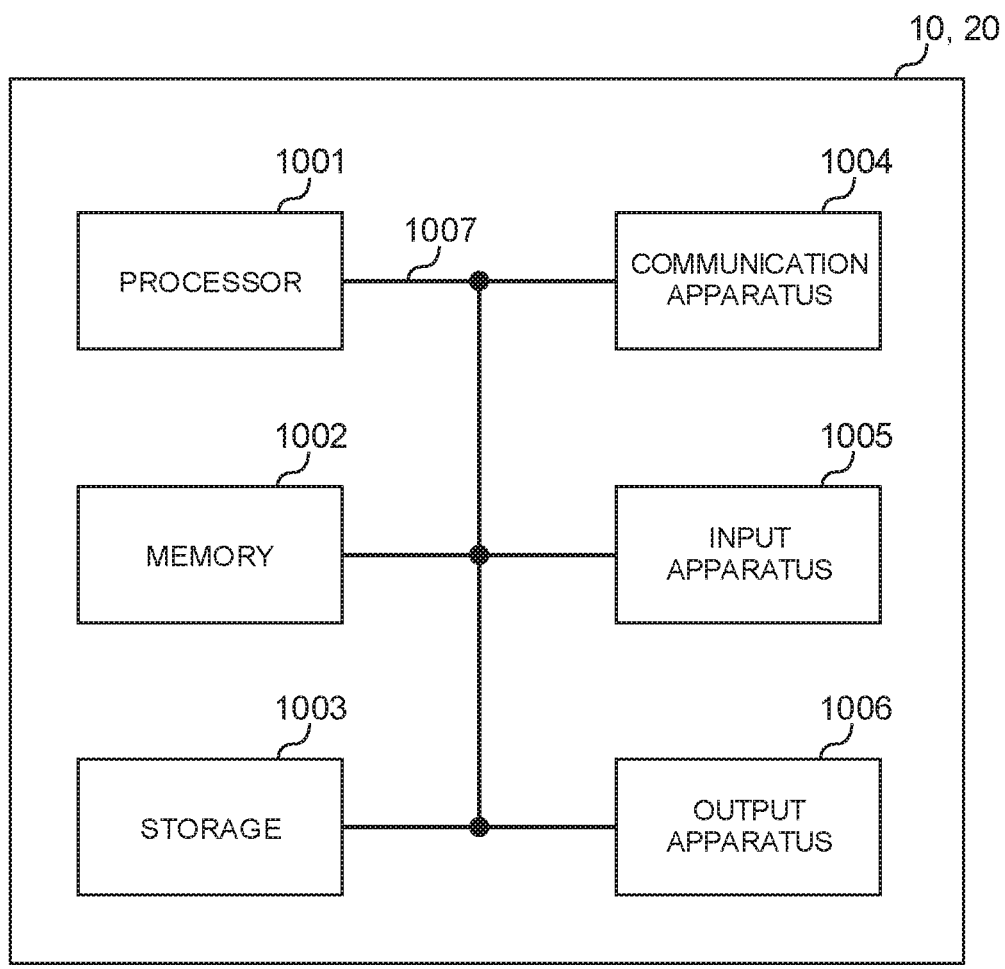
FIG. 14 is a diagram to show an exemplary hardware structure of a radio base station and a user terminal according to one embodiment of the present invention.

For example, the radio base station, user terminals and so on according to embodiments of the present invention may function as a computer that executes the processes of the radio communication method of the present invention. FIG. 14 is a diagram to show an exemplary hardware structure of a radio base station and a user terminal according to one embodiment of the present invention. Physically, the above-described radio base stations 10 and user terminals 20 may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawing, or may be designed not to include part of the apparatus.

For example, although only one processor 1001 is shown, a number of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, registers and so on. For example, the above-described baseband signal processing section 104 (204), call processing section 105 and others may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented using at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) that does not depend on numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a number of minislots. Each mini-slot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a number of consecutive subframes may be referred to as a "TTI," or one slot or minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "minislot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a number of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a number of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by its higher nodes (upper nodes). In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access."

As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a processor that determines an integer value of integer values, corresponding to an uplink control information value of uplink control information values, the integer values respectively corresponding to the uplink control information values including at least one of a Hybrid Automatic Repeat reQuest-Acknowledgement (HARQ-ACK) and a Scheduling Request (SR), determines a cyclic shift based on the integer value, and generates a sequence based on the cyclic shift; and
a transmitter that transmits the sequence in an uplink control channel,
wherein an interval between two cyclic shifts respectively based on two consecutive integer values is $\pi/6$,
a first integer value of the integer values corresponds to a first uplink control information value which includes a 2-bit HARQ-ACK value 00 and a negative SR,
a second integer value of the integer values corresponds to a second uplink control information value which includes a 2-bit HARQ-ACK value 01 and the negative SR,
a third integer value of the integer values corresponds to a third uplink control information value which includes the 2-bit HARQ-ACK value 00 and a positive SR,
a difference between the first integer value and the second integer value is 3, and
a difference between the first integer value and the third integer value is 1.

2. The terminal according to claim 1, wherein the 2-bit HARQ-ACK value 00 indicates two Negative Acknowledgements, NACKs.

3. The terminal according to claim 2, wherein an interval of four cyclic shifts respectively based on four 2-bit HARQ-ACK values is $\pi/2$.

4. The terminal according to claim 1, wherein an interval of four cyclic shifts respectively based on four 2-bit HARQ-ACK values is $\pi/2$.

5. A communication method for a terminal, comprising:
determining an integer value of integer values, corresponding to an uplink control information value of uplink control information values, the integer values respectively corresponding to the uplink control information values including at least one of a Hybrid Automatic Repeat reQuest-Acknowledgement (HARQ-ACK) and a Scheduling Request (SR), determining a cyclic shift based on the integer value, and generating a sequence based on the cyclic shift; and
transmitting the sequence in an uplink control channel,
wherein an interval between two cyclic shifts respectively based on two consecutive integer values is $\pi/6$,
a first integer value of the integer values corresponds to a first uplink control information value which includes a 2-bit HARQ-ACK value 00 and a negative SR,
a second integer value of the integer values corresponds to a second uplink control information value which includes a 2-bit HARQ-ACK value 01 and the negative SR,
a third integer value of the integer values corresponds to a third uplink control information value which includes the 2-bit HARQ-ACK value 00 and a positive SR,
a difference between the first integer value and the second integer value is 3, and
a difference between the first integer value and the third integer value is 1.

6. A system comprising:
a terminal that comprises:
  a processor that determines an integer value of integer values, corresponding to an uplink control information value of uplink control information values, the integer values respectively corresponding to the uplink control information values including at least one of a Hybrid Automatic Repeat reQuest-Acknowledgement (HARQ-ACK) and a Scheduling Request (SR), determines a cyclic shift based on the integer value, and generates a sequence based on the cyclic shift; and
  a transmitter that transmits the sequence in an uplink control channel; and
a base station that receives the sequence,
wherein an interval between two cyclic shifts respectively based on two consecutive integer values is $\pi/6$,
a first integer value of the integer values corresponds to a first uplink control information value which includes a 2-bit HARQ-ACK value 00 and a negative SR,
a second integer value of the integer values corresponds to a second uplink control information value which includes a 2-bit HARQ-ACK value 01 and the negative SR,
a third integer value of the integer values corresponds to a third uplink control information value which includes the 2-bit HARQ-ACK value 00 and a positive SR,
a difference between the first integer value and the second integer value is 3, and
a difference between the first integer value and the third integer value is 1.

* * * * *